United States Patent
Hugot et al.

(10) Patent No.: US 9,415,462 B2
(45) Date of Patent: Aug. 16, 2016

(54) METHOD FOR CLEANING AND STRIPPING A TURBOSHAFT ENGINE BLADE USING A PULSED LASER

(75) Inventors: Juliette Hugot, Jaunay-Clan (FR); Franck Bourdin, Saint Marc sur Couesnon (FR); Thierry Fevrier, Louvigne du Desert (FR); Jerome Gestin, Gosne (FR)

(73) Assignee: SNECMA, Paris (FR)

( * ) Notice: Subject to any disclaimer, the term of this patent is extended or adjusted under 35 U.S.C. 154(b) by 270 days.

(21) Appl. No.: 14/114,836
(22) PCT Filed: May 2, 2012
(86) PCT No.: PCT/FR2012/050972
§ 371 (c)(1),
(2), (4) Date: Oct. 30, 2013
(87) PCT Pub. No.: WO2012/150413
PCT Pub. Date: Nov. 8, 2012

(65) Prior Publication Data
US 2014/0082939 A1    Mar. 27, 2014

(30) Foreign Application Priority Data
May 2, 2011 (FR) ...................................... 11 53733

(51) Int. Cl.
*B23K 26/00*  (2014.01)
*F01D 5/00*   (2006.01)
(Continued)

(52) U.S. Cl.
CPC ......... *B23K 26/0051* (2013.01); *B23K 26/0006* (2013.01); *B23K 26/0072* (2013.01); *B23K 26/0078* (2013.01); *B23K 26/362* (2013.01); *B23K 26/40* (2013.01); *F01D 5/005* (2013.01); *F01D 5/284* (2013.01); *F01D 5/288* (2013.01); *F01D 25/002* (2013.01); *B23K 2201/34* (2013.01); *B23K 2203/08* (2013.01);
(Continued)

(58) Field of Classification Search
CPC ............ B23K 26/0051; B23K 26/365; B23K 26/0078; B23K 26/0072; B23K 26/408; B23K 26/409; B23K 26/401; F01D 5/284; F01D 5/288; F01D 5/005; F01D 25/002; Y10T 29/49318; F05D 2230/90; F05D 2230/13
See application file for complete search history.

(56) References Cited

U.S. PATENT DOCUMENTS 6,172,331 B1 * 1/2001 Chen .................... B23K 26/032
                                                      219/121.7
6,380,512 B1   4/2002 Emer
(Continued)

FOREIGN PATENT DOCUMENTS

EP    1 473 373    11/2004
EP    1 591 188    11/2005

OTHER PUBLICATIONS

International Search Report Issued Jun. 28, 2012 in PCT/FR12/050972 Filed May 2, 2012.

*Primary Examiner* — Richard Chang
(74) *Attorney, Agent, or Firm* — Oblon, McClelland, Maier & Neustadt, L.L.P.

(57) ABSTRACT

A method for cleaning a turboshaft engine blade comprising a superalloy body covered with a coating, in which the coating of the blade is at least partially machined using a pulsed laser. At least the feed rate of the pulsed laser and the pulse frequency of the pulsed laser are parameterized such that the machined surface of the blade has a roughness of 4 μm to 10 μm.

15 Claims, 3 Drawing Sheets

(51) Int. Cl.
  *F01D 5/28*  (2006.01)
  *F01D 25/00*  (2006.01)
  *B23K 26/36*  (2014.01)
  *B23K 26/40*  (2014.01)

(52) U.S. Cl.
  CPC ....... *B23K2203/172* (2015.10); *B23K 2203/52* (2015.10); *F05D 2230/13* (2013.01); *F05D 2230/90* (2013.01); *Y10T 29/49318* (2015.01)

(56) References Cited

U.S. PATENT DOCUMENTS

| | | | |
|---|---|---|---|
| 7,452,476 | B2 | 11/2008 | Bayer et al. |
| 7,776,165 | B1 * | 8/2010 | Dulaney ............... C21D 10/005 148/525 |
| 2004/0217094 | A1 | 11/2004 | Mannava et al. |
| 2005/0224474 | A1 | 10/2005 | Kilburn |
| 2007/0075060 | A1 | 4/2007 | Shedlov et al. |

* cited by examiner

METHOD FOR CLEANING AND STRIPPING A TURBOSHAFT ENGINE BLADE USING A PULSED LASER

BACKGROUND OF THE INVENTION

1. Field of the Invention

The invention relates to the field of maintenance and repair of aeronautical parts, in particular of the blades of a turboshaft engine.

2. Description of the Related Art

A blade is understood to be a part having a surface capable of channelling an air flow in the turboshaft engine, wherein this part may be movable (rotor blade) or fixed (stator blade).

Conventionally, in the course of a maintenance operation of a turboshaft engine it is necessary to inspect the blades of the turboshaft engine in order to detect any defects such as cracks or splits. A turboshaft engine blade includes a superalloy structural body covered with a plurality of layers of material in order to form the coating of the blade. During its use the coating of the blade wears and is eaten away and must be replaced in order to ensure optimal operation of the blades. The replacement of the coating of a blade necessitates on the one hand removing the worn coating and on the other hand applying a new coating to the body of the blade.

In practice, following the removal of the worn coating the blade is inspected in order to detect possible defects such as cracks or splits in the body of the blade. This makes it possible to avoid a situation in which a blade of which the superalloy body has been damaged is coated with a new coating.

It is known that a blade coating generally includes at least one metal layer covering the body of the blade and a ceramic layer covering the metal layer. In the course of its operation, the coating may develop oxides and may exhibit portions which are corroded or polluted (dirt, grease, combustion residues, etc.). The metal layer of which the thickness is between 50 and 100 µm is conventionally designated "metal sub-layer" by the person skilled in the art whilst the ceramic layer of which the thickness is between 150 and 350 µm is conventionally designated "thermal barrier". Such a coating is known from the application FR 2814473 A1 in the name of Snecma.

The method of removal of the worn coating of the blade includes a plurality of successive steps such as steps of stripping, sanding and cleaning by means of jets of water and/or immersion in acid baths. A method according to the prior art results in emissions of dangerous substances into the atmosphere and into water, which present a drawback for the environment. Moreover, such a method is long taking into account the various steps which must be implemented consecutively.

In fact, as an example, in order to remove a coating from a turboshaft engine blade the following steps are implemented:

cleaning of the surface of the blade in a non-aggressive manner in order to remove all the oxides and pollutants present on the surface of the blade;

inspection of the cleaned surface of the blade in order to determine whether the blade can be repaired; and cleaning of the surface of the blade in an aggressive manner in order to remove the different layers of the coating of the blade;

The cleaning referred to as "non-aggressive" includes steps of degreasing of the blade, cleaning of the internal circuits of the blade and removal of the surface oxides.

The cleaning referred to as "aggressive" includes, for its part, steps of sanding of the blade, stripping of the thermal barrier, stripping of the metal sub-layer and other layers, cleaning of the surfaces and splits in the superalloy blade body, and cleaning of the cooling channels of the blade.

After repair of the body of the blade, a step of sanding is conventionally implemented in order to give the body of the blade a roughness which favours the adhesion of a coating.

The different cleaning actions previously cited are generally implemented manually and produce heterogeneous results depending upon the operators, in particular during the sanding. In certain cases, the superalloy blade body can sometimes be damaged during the cleaning and the blade must be scrapped. Furthermore, such a method can last for several hours, which presents a drawback.

BRIEF SUMMARY OF THE INVENTION

The present invention aims to eliminate at least some of these drawbacks in order to quickly remove a coating from a turboshaft engine blade whilst respecting the environment and to prepare the surface of the blade.

To this end the invention relates to a method for cleaning and stripping a turboshaft engine blade comprising a superalloy body covered with a coating, in which the coating of the blade is at least partially machined using a pulsed laser. A pulsed laser advantageously permits removal of the coating locally without damage to the superalloy body of the blade. Furthermore, laser machining makes it possible to provide a roughness on the body of the blade, which avoids the use of an additional step of sanding. Moreover, no chemical product is used, which limits the costs relating to the treatment of chemical waste.

Preferably, as the coating comprises at least one external ceramic layer the pulsed laser is parameterised in order to machine only the external ceramic layer. Thus the damaged ceramic layer can be replaced and a new external ceramic layer can be applied to the cleaned surface.

Also preferably, as the coating comprises at least one external ceramic layer and one metal layer disposed between the superalloy body and the ceramic layer, the pulsed laser is parameterised in order to machine only the external ceramic layer and the metal layer. Thus the damaged layers can be replaced and new layers can be applied to the cleaned surface.

According to one aspect of the invention, the pulsed laser is parameterised in order to machine the entire coating of the blade (ceramic layer and metal layer). Thus the damaged coating can be replaced and a new coating can be applied to the superalloy body, the surface of which has been prepared and has the desired roughness.

In a preferred manner, at least the feed rate of the pulsed laser and the pulse frequency of the pulsed laser are parameterised such that the machined surface of the blade has a roughness of 4 µm to 10 µm. This makes it possible in an advantageous manner to apply a new layer or a new coating taking advantage of an application surface which has good qualities of adhesion.

The feed rate of the pulsed laser is preferably between 25 mm/s and 1000 mm/s, preferably between 100 mm/s and 600 mm/s. Such a rate makes it possible to ensure a good compromise between the depth of machining and the rate of machining.

More preferably, the pulse frequency of the pulsed laser is between 12 kHz and 50 kHz, preferably less than or equal to 16 kHz. Such a frequency makes it possible to ensure a good compromise between the depth of machining and the rate of machining.

The roughness is preferably constant over the machined coating so as to allow a homogeneous adhesion of a new coating and therefore an increase in the service life thereof.

Preferably, as the coating comprises a plurality of layers, the pulsed laser machines the layers of the coating by carrying out a plurality of machining passes, the number of machining passes for a layer being defined as a function of the thickness of the layer and the hardness of the material of the layer. Thus the same parameterisation of the laser can be retained in order to machine a plurality of layers, and only the number of passes has to be parameterised as a function of the nature of the layers.

Again preferably, the pulsed laser is moved along machining lines on the coating, two consecutive machining lines overlapping. Thus a homogeneous distribution of the bumps and the hollows forming the roughness of the stripped surface is obtained, which enables optimal adhesion of a new coating.

According to one aspect of the invention, a controller moves the pulsed laser in the course of the machining along a defined trajectory based on three-dimensional modelling of the blade to be cleaned.

Due to the use of a controller the cleaning of the blades is homogeneous and precise and the risk of injury to an operator is limited.

BRIEF DESCRIPTION OF THE SEVERAL VIEWS OF THE DRAWINGS

The invention will be better understood when reading the following description given solely by way of example and with reference to the appended drawings, in which.

DETAILED DESCRIPTION OF THE INVENTION

Figure 1:
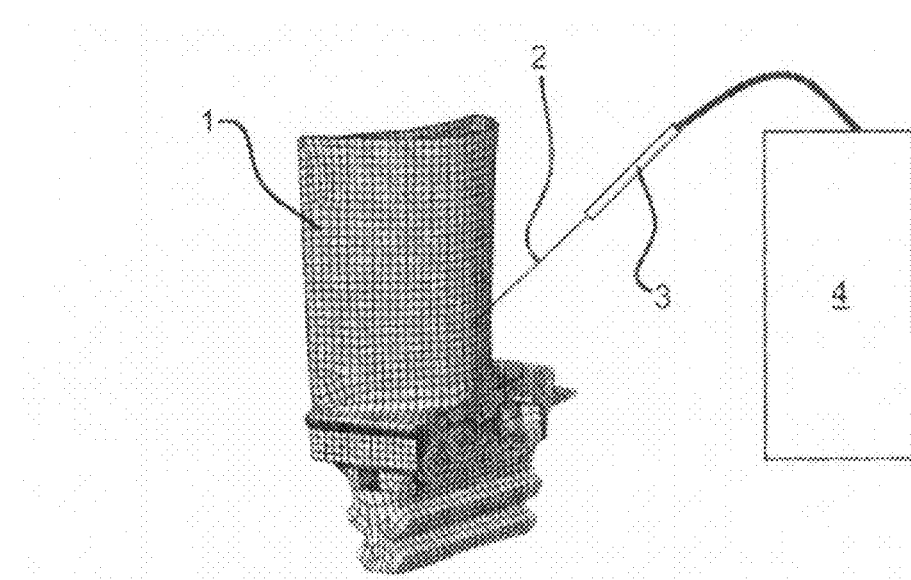
FIG. 1 shows a schematic view of machining of a portion of the coating of a turboshaft engine blade using a pulsed laser controlled by an automated robot.
Figure 2:
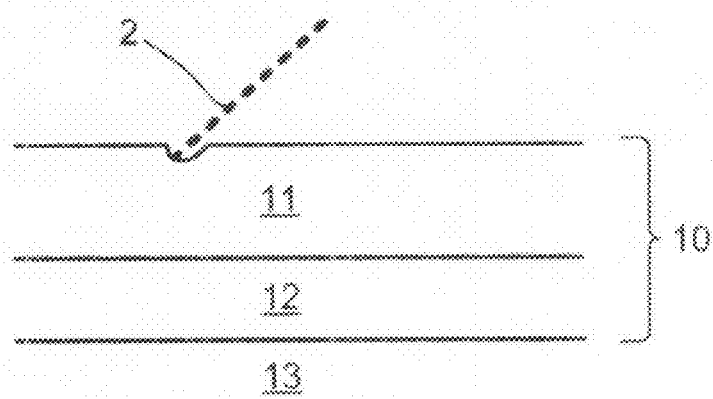
FIG. 2 shows a schematic sectional view of a coating of a blade during laser machining thereof.

With reference to FIGS. 1 and 2, the invention relates to a method for cleaning a turboshaft engine blade 1 having a superalloy body 13 covered with a coating 10. In this example the coating 10 of the blade 1 includes a metal layer 12 covering the body of the blade 13 and a ceramic layer 11 covering the metal layer 12. The metal layer 12 of which the thickness is between 50 and 100 µm is conventionally designated "metal sub-layer" by the person skilled in the art whilst the ceramic layer 11 of which the thickness is between 150 and 350 µm is conventionally designated "thermal barrier".

By the method of cleaning according to the invention, the coating 10 of the superalloy body 13 of the blade 1 is removed by means of a pulsed laser 3 as shown schematically in FIG. 1.

By way of example, the pulsed laser 3 is a laser of the yttrium aluminium garnet type, better known by its abbreviation YAG, the power of which is approximately 20 W. As shown in FIG. 1, the beam 2 of the pulsed laser 3 is directed onto the surface of the blade 1 in order to machine the coating 10 of the blade 1, the pulsed laser 3 making it possible to cause the coating 10 to explode in a localised manner without damaging the body 13 of the blade 1 which is very advantageous. Furthermore, no harmful product is used, which respects the environment. Moreover, from the point of view of safety, the laser machining is preferably carried out by means of an automated robot 4 so as to limit the risk of injuries to operators. Thus, advantageously, each blade 1 is cleaned homogeneously and reproducibly.

The pulsed laser 3 is preferably connected to a controller 4 arranged in order to move the laser 3 on the surface of the blade 1 along a predefined trajectory. Preferably, the machining trajectory of the laser 3 is parameterised by a three-dimensional modelling of the blade 2 which is supplied to the controller 4. The pulsed laser 3 is preferably oriented in a direction normal to the surface of the blade 1 so as to enable optimal stripping of the coating 10 of the blade 1.

In order to remove the coating 10 from the blade 1, the laser beam 2 sweeps the coating 10 of the blade 1 starting from one end of the blade 1. The laser beam 2 is preferably moved in a rectilinear manner along a machining line 20, each machining line 20 being formed by a plurality of machining points 21, aligned in a rectilinear manner as shown in FIGS. 3A, 3B, 4A, 4B, each machining point 21 corresponding to a pulse of the pulsed laser 3.

The pulsed laser 3 is parameterised in such a way as to enable rapid removal of the coating 10 without damaging the body of the blade 13. Furthermore, the pulsed laser 3 can be parameterised in order to remove all or part of the coating 10 of the blade 1. To this end, a plurality of parameters of the pulsed laser 3 can be taken into account such as the width of the laser beam 2, the spacing E of the laser lines, the frequency F of the laser pulses, the pulse time, the focal distance, the feed rate V of the beam, the power of the laser and the number of passes on the blade. According to the invention, as will be detailed below, at least the feed rate of the pulsed laser and the pulse frequency of the pulsed laser are parameterised such that the machined surface of the blade has a roughness of 4 µm to 10 µm.

The roughness is a surface state of the blade after stripping. On the surface of the blade this leads to the presence of a relief formed of hollows and bumps. The roughness value is defined as the distance between the top of a bump and the cavity of a hollow. A roughness of controlled and constant value over the blade makes it possible in an optimal and rapid manner to apply a new coating by adhesion to the bumps of the stripped surface of the blade.

Width of the Laser Beam

Figure 3A:
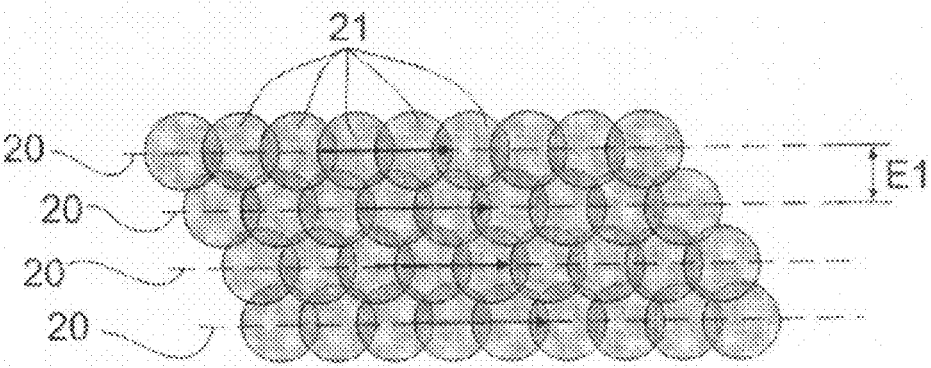
FIG. 3A shows laser machining lines spaced apart from one another by a first distance E1.

The width of the beam 2 corresponds to the surface for application of the power of the laser beam 2 during its contact with the coating as shown schematically in FIG. 3A. The narrower the beam 2, the more concentrated the power of the beam 2, which increases the impact of the beam 2 on the coating 10 and therefore the thickness of the coating which will be removed for an individual pulse of the laser 3, i.e. for a machining point 21 of a machining line 20. The width of the laser beam 2 is preferably equal to 0.01 mm, 0.03 mm or 0.05 mm in such a way as to form machining points 21 of which the diameter is equal to 0.01 mm, 0.03 mm or 0.05 mm. Consequently the width of the laser beam 2 is equal to 0.03 mm, which ensures a good compromise between the machining surface and the depth of machining.

Pulse Time

The pulse time defines the period during which the laser beam 2 is in contact with the coating 10 on a given machining point 21. The longer the pulse duration, the more considerable the thickness of the coating 10 removed for an individual pulse of the laser 3. Consequently the laser beam 3 is parameterised with a pulse time of approximately 3 μs which ensures a good compromise between the machining rate and the depth of machining.

Spacing E of the Laser Lines

Figure 3B:
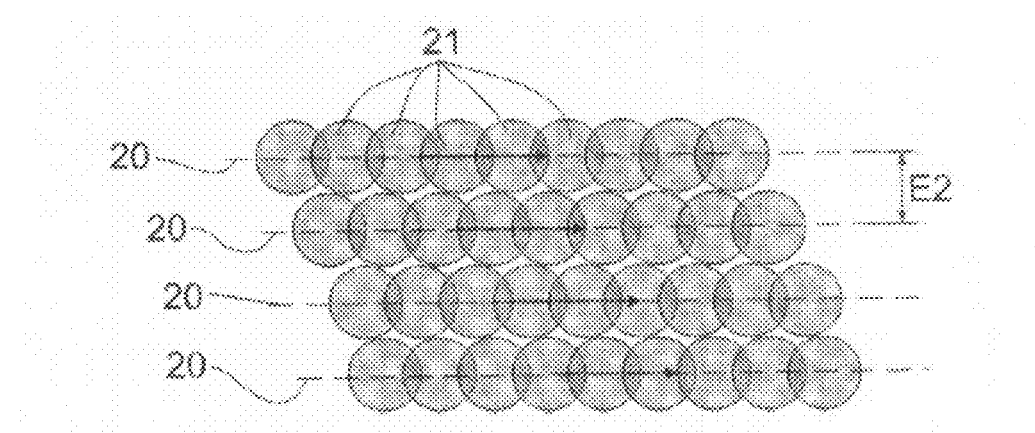
FIG. 3B shows laser machining lines spaced apart from one another by a second distance E2.

As shown in FIGS. 3A and 3B, the laser beam 2 moves in a rectilinear manner along parallel machining lines 20, each machining line 20 being formed by a plurality of machining points 21 which are aligned in a rectilinear manner.

The spacing E between the machining lines makes it possible to define a covering surface between two machining lines 20 which are adjacent. With reference to FIG. 3A, if the machining lines 20 are close to one another (spacing E1), the overlap of the machining lines 20 is substantial, which may present a risk of excessive machining of the coating 10. On the other hand, with reference to FIG. 3B, if the machining lines 20 are spaced apart from one another (spacing E2), the coating 10 situated between the adjacent machining lines 20 is not removed, which is a drawback. Preferably the spacing E between the machining lines 20 is parameterised in such a way that it is less than the width of the beam 2 in order to enable a coverage greater than half of the width of the beam 2 so as to eliminate any lack of machining and to avoid excessive machining. In this example, for a width of the laser beam 2 equal to 0.03 mm, the space E between the machining lines 20 is equal to 0.025 mm.

Advantageously, two successive machining lines overlap so as to allow a homogeneous roughness to be obtained on the machined surface of the blade 1 and thus to enable the application of a new coating with optimal adhesion.

Focal Length

This parameter is defined for a given pulsed laser 3 and indicates the distance at which the laser beam 3 has the previously defined width of beam 2. This parameter must be respected in order to control the width of the beam and hence its power. Consequently consideration is given to a YAG laser 3 of focal length equal to 20 cm, which corresponds in this example to the distance between the window of the laser and the point of impact on the blade being treated.

Frequency F of Pulses of the Laser 3 and Feed Rate V of the Laser Beam 2

Figure 4A:
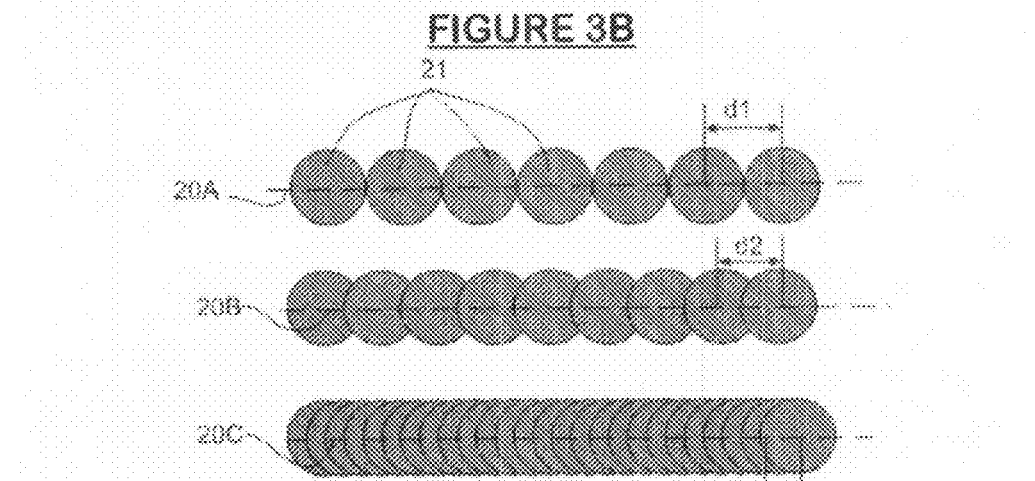
FIG. 4A shows three laser machining lines each including a plurality of machining points, the machining lines being respectively formed by a pulsed laser of which the pulse frequencies are different.
Figure 4B:
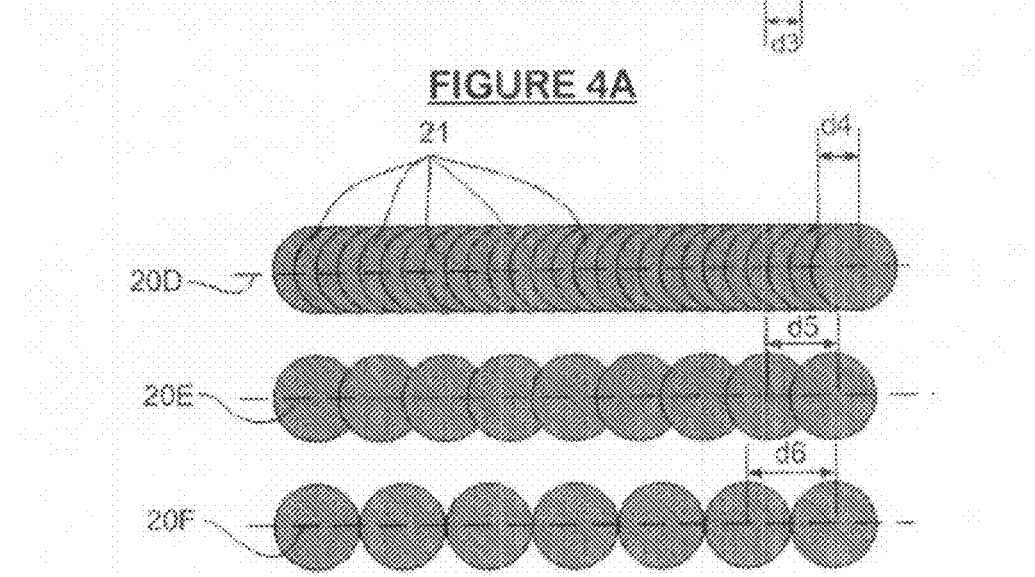
FIG. 4B shows three laser machining lines each including a plurality of machining points, the machining lines being respectively formed by a pulsed laser of which the feed rates are different.

The frequency F of the laser beam 2 defines the frequency of the pulse train. During the laser machining, the frequency F is directly associated with the feed rate V of the beam 2 in order to define the spacing d between two consecutive machining points 21 of one and the same machining line 20, as shown in FIGS. 4A-4B.

For a given machining line 20, with a constant feed rate V, the higher the frequency F of the pulses, the closer the machining points 21 are to one another. By way of example, with reference to FIG. 4A, the machining lines 20A, 20B, 20C are formed with a pulsed laser 3 of constant feed rate V, equal to 250 mm/s, and of which the pulse frequencies are respectively equal to 5 kHz, 12 kHz and 25 kHz. The higher the frequency of the pulses, the more the distance d1, d2, d3 separating consecutive machining points 21 is reduced. In practice, any frequency F between 12 kHz and 50 kHz is compatible.

The feed rate V of the laser beam 2 is defined according to the direction of a machining line 20. Thus for a given machining line 20, for a constant pulse frequency F, the distance separating consecutive machining points 21 is a function of the feed rate V. By way of example, with reference to FIG. 4B, the machining lines 20D, 20E, 20F are formed with a pulsed laser 3 of constant frequency F, equal to 12 kHz, and of which the feed rates V are respectively equal to 125 mm/s, 250 mm/s and 500 mm/s. The higher the feed rate, the greater the distance d4, d5, d6 separating consecutive machining points 21. In practice, any feed rate V between 25 mm/s and 1000 mm/s is compatible.

Preferably, for one and the same layer to be machined, the pulsed laser 3 has the same parameterisation at each pass. Thus, the greater the thickness of a layer to be removed, the higher the number of passes. Preferably also, for one and the same coating to be machined, the pulsed laser 3 has the same parameterisation at each pass for each of the layers. The number of passes is defined as a function of the thickness and the hardness of the material of each layer.

According to a first embodiment of the method according to the invention, only the ceramic layer 11 of the coating 10 of the blade 1 is removed by means of the pulsed laser 3, said laser being parameterised as follows:

Width of the beam: 0.03 mm
Spacing E of the laser lines: 0.025 mm
Frequency F of the laser pulses: 12 kHz
Pulse time: 3 μs
Focal length: 20 cm
Feed rate V of the beam: 250 mm/s In order to entirely remove the ceramic layer 11, 50 passes of the laser beam 3 are made on the coating 10. In other words, for a defined machining line 20 on the coating 10, the laser is moved 50 times on said machining line 20 in the course of the method of cleaning, which makes it possible to remove the coating 10 progressively with the passes of the laser beam 2.

Figure 5A:
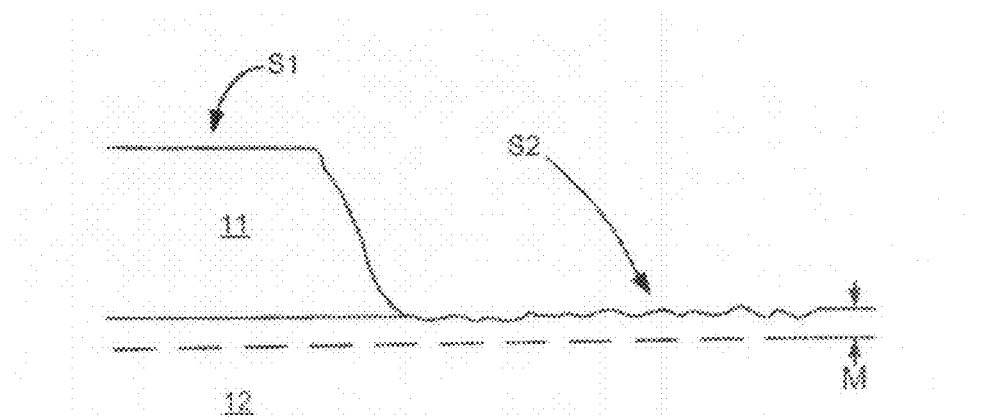
FIG. 5A is a sectional view of a coating of a turboshaft engine blade for a first embodiment of the invention.
Figure 5B:
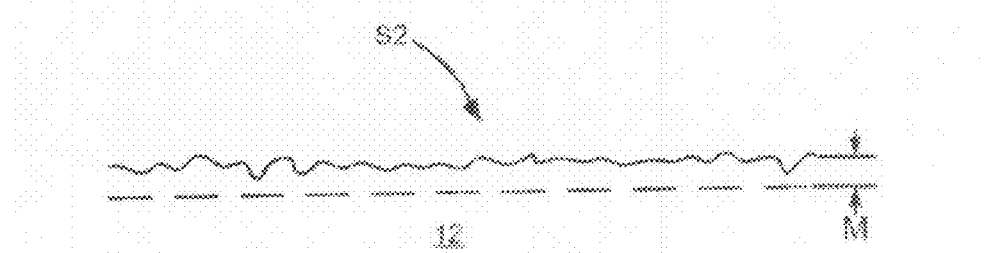
FIG. 5B shows a comparable sectional view of the surface of the blade of FIG. 5A after the laser machining.

With reference to FIGS. 5A and 5B showing a sectional view of the coating after machining, the first embodiment of the method according to the invention makes it possible to selectively remove the ceramic layer 11 of the coating 10 of which the thickness is approximately 200 μm. As shown in FIG. 5A, the ceramic layer 11 has only been partially removed from the blade 1, the blade 1 thus including an uncleaned surface S1 consisting of the ceramic layer 11 and a cleaned surface S2 consisting of the metal layer 12 after laser machining.

Advantageously, with reference to FIG. 5B showing a comparable view of the cleaned surface S2, the roughness of the cleaned surface S2 of the coating 10 after laser machining is approximately 7 to 9 μm. The roughness of the cleaned surface S2 advantageously makes it possible to deposit a new ceramic layer 11 directly on the metal layer 12 without previously carrying out a step of sanding, as is the case in the methods according to the prior art. In other words, the cleaning of the blade by means of a pulsed laser 3 makes it possible, on the one hand, to remove all or part of the coating 10 and, on the other hand, to prepare the cleaned surface S2 to receive a new protective layer, in this case a new ceramic layer 11.

A second embodiment of the invention is described with reference to FIG. 6A. The references used to describe the elements with an identical, equivalent or similar structure or function to those of the elements of FIG. 5A are the same, in order to simplify the description. Moreover, not all of the description of the embodiment of FIG. 5A is reproduced, this description applying to the elements of FIG. 6A when there are no incompatibilities. Only the significant structural and functional differences are described.

According to the second embodiment, the pulsed laser is parameterised in an identical manner to the first embodiment, only the frequency F of the pulses of the laser and the feed rate V being modified. In this embodiment, the pulse frequency F of the laser is 16 kHz and the feed rate V is 500 mm/s. In a similar manner to the first embodiment, the pulsed laser 3 performs approximately 50 passes on the coating of the blade 1 in the course of the method of cleaning, which makes it possible to remove the coating progressively with the passes of the laser beam 2.

Figure 6A:
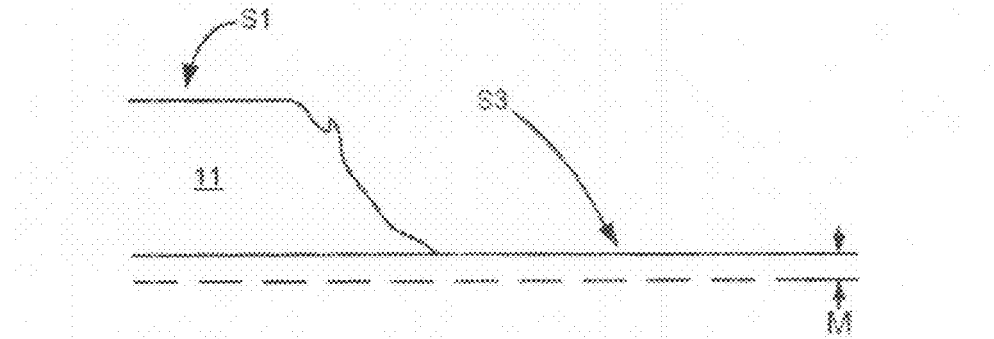
FIG. 6A is a sectional view of a coating of a turboshaft engine blade for a second embodiment of the invention.
Figure 6B:
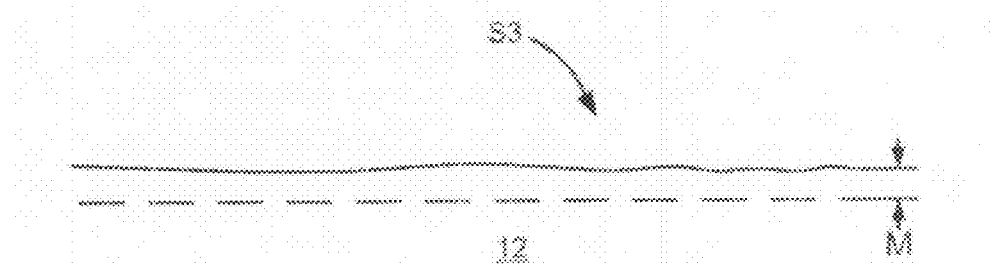
FIG. 6B shows a comparable sectional view of the surface of the blade of FIG. 5B after the laser machining.

With reference to FIGS. 6A and 6B, the second embodiment of the method according to the invention also makes it possible to selectively remove the ceramic layer 11 of the coating 10. Advantageously, the roughness of the surface of the coating 10 after laser machining is 4 to 6 μm as shown in FIG. 6B. Thus the desired roughness is advantageously parameterised by modifying the pulse frequency F of the laser and the feed rate V.

According to a third embodiment of the method according to the invention, the coating 10 of the blade 1 is entirely removed by means of the pulsed laser 3. In other words, all the layers of the coating 10 of the blade 1 are removed, including the ceramic layer 11 and the metal layer 12. To this end, the pulsed laser 3 is parameterised as follows:

Width L of the beam: 0.03 mm
Spacing E of the laser lines: 0.025 mm
Frequency F of the laser pulses: 12 kHz
Pulse time: 3 μs
Focal length: 20 cm
Feed rate V of the beam: 250 mm/s In this third embodiment, the pulsed laser 3 performs approximately 250 passes on the coating 10 of the blade 1 in the course of the method of cleaning, which makes it possible to remove the coating 10 progressively with the passes of the laser beam 2. The number of passes here is greater by comparison with the preceding embodiments of the method in order to increase the thickness of the coating 10 to be removed. These parameters make it possible to strip the ceramic layer 11 and the metal layer 12 which make up the coating 10.

In a particular embodiment, the substrate can be machined in order to obtain the desired roughness and thus to enable the adhesion of a new coating.

After removal of the coating 10, the superalloy body 13 is bare, which advantageously makes it possible to inspect its surface in order to detect any defects before application of a new coating 10.

In a similar manner to the first embodiment of the method according to the invention, the roughness of the cleaned surface, that is to say the surface of the superalloy body 13, is approximately 7 to 9 μm. This roughness advantageously makes it possible to deposit a new metal layer 12 directly on the superalloy body 13. It is then sufficient to deposit a new ceramic layer 11 on the metal layer 12 in order to form the coating 10. Because of the overlapping of the machining lines, the roughness obtained is homogeneous over the treated surface of the blade, the treated surface having hollows and bumps regularly spaced apart from one another.

According to a fourth embodiment of the invention, the coating 10 of the blade 1 is entirely removed by means of the pulsed laser 3 parameterised as set out below:

Width L of the beam: 0.03 mm
Spacing E of the laser lines: 0.025 mm
Frequency F of the laser pulses: 16 kHz
Pulse time: 3 μs
Focal length: 20 cm
Feed rate V of the beam: 350 mm/s In this fourth embodiment, the pulsed laser 3 performs approximately 100 passes on the coating 10 of the blade 1 in the course of the method of cleaning, which makes it possible to remove the coating 10 (the ceramic layer 11 and the metal layer 12) progressively with the passes of the laser beam 2. The number of passes here is greater by comparison with the first two embodiments of the method in order to increase the thickness of the coating 10 to be removed. After removal of the coating 10, the superalloy body 13 is bare, which advantageously makes it possible to inspect its surface in order to detect any defects before application of a new coating 10.

The parameters of this fourth embodiment of the invention make it possible to strip the layers 11 and 12 forming the coating 10 by obtaining a roughness of 4 to 6 μm of the surface of the superalloy body 13. Such a roughness is advantageous for depositing a new metal layer 12.

The invention claimed is:

1. A method for cleaning and stripping a turboshaft engine blade comprising a superalloy body covered with a coating, comprising:
   identifying a portion of the coating to remove, the coating including a metal layer covering the body of the blade and an external ceramic layer covering the metal layer; and
   machining, at least partially, the coating of the blade using a pulsed laser to remove at least the external ceramic layer of the coating,
   wherein a feed rate of the pulsed laser and a pulse frequency of the pulsed laser are parameterized such that a machined surface of the blade has a roughness of 4 μm to 10 μm.

2. The method according to claim 1, wherein the pulsed laser is parameterized in order to remove only the external ceramic layer.

3. The method according to claim 1, wherein the pulsed laser is parameterized in order to remove only the external ceramic layer and the metal layer.

4. The method according to claim 1, wherein the pulsed laser is parameterized in order to remove the entire coating of the blade.

5. The method according to claim 1, wherein the feed rate of the pulsed laser is between 25 mm/s and 1000 mm/s.

6. The method according to claim 5, wherein the feed rate of the pulsed laser is between 100 mm/s and 600 mm/s.

7. The method according to claim 1, wherein the pulse frequency of the pulsed laser is between 12 kHz and 50 kHz.

8. The method according to claim 7, wherein the pulse frequency of the pulse laser is less than or equal to 16 kHz.

9. The method according to claim 1, wherein the roughness is constant over the machined coating.

10. The method according to claim 1, wherein the coating comprises a plurality of layers, the pulsed laser machines the layers of the coating by carrying out a plurality of machining passes, and the number of machining passes for a layer is defined as a function of a thickness of the layer and a hardness of a material of the layer.

11. The method according to claim 1, wherein the pulsed laser is moved along machining lines on the coating, and two consecutive machining lines overlap.

12. The method according to claim 1, wherein a controller moves the pulsed laser in the course of the machining along a defined trajectory based on three-dimensional modeling of the blade to be cleaned.

13. The method according to claim 1, wherein the superalloy body of the blade is not removed by the machining.

14. The method according to claim 1, wherein a width of the pulsed laser is less than or equal to 0.05 mm.

15. The method according to claim 1, wherein the metal layer has a thickness between 50 and 100 µm and the external ceramic layer has a thickness between 150 and 350 µm.

* * * * *